Dec. 27, 1927.
W. R. WICKERHAM
1,654,316
CIRCUIT INTERRUPTER SYSTEM
Filed Oct. 5, 1923
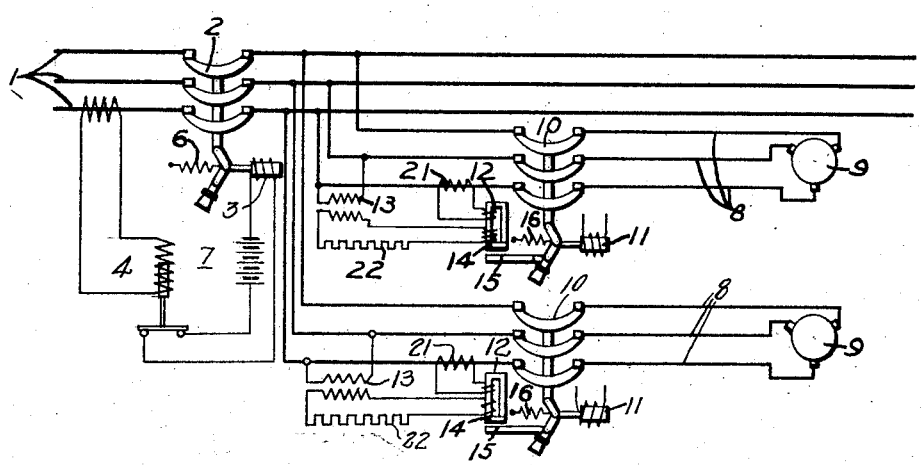
WITNESSES:
INVENTOR
William R. Wickerham.
BY
ATTORNEY Patented Dec. 27, 1927.

1,654,316

UNITED STATES PATENT OFFICE.

WILLIAM R. WICKERHAM, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTER SYSTEM.

Application filed October 5, 1923. Serial No. 666,734.

My invention relates to systems of electrical distribution and more particularly to such systems as are adapted to supply energy from a common distributing circuit to a plurality of feeder circuits.

An object of my invention is to provide a system of distribution that shall embody a circuit interrupter of relatively large capacity in the distributing circuit and which embodies a circuit interrupter of smaller capacity in each of the feeder circuits.

Another object of my invention is to provide a system of electrical distribution comprising a main circuit having a circuit interrupter therein and a plurality of feeder circuits, each of which is provided with a circuit interrupter, in which an overloaded feeder circuit interrupter is held in its closed position until the main circuit interrupter is operated, whereupon the feeder circuit interrupter is operated by reason of the low voltage or voltage failure in the circuit resulting from the operation of the main circuit interrupter.

Another object of my invention is to provide a suitable releasing mechanism for operating the feeder circuit interrupters in accordance with the foregoing objects.

A further object of my invention is to provide a system of electrical distribution embodying a distributing circuit having a circuit interrupter therein and a plurality of feeder circuits each of which has a circuit interrupter therein, such that the circuit interrupters are operated in a predetermined sequence without any interconnected relays or other devices other than the ordinary conductors.

It is a still further object of my invention to provide a distributing system with a large capacity circuit interrupter and to supply each of a plurality of feeder circuits with small capacity circuit interrupters, the latter being strong enough to stand the mechanical and electrical strains which are brought about when they are subjected to short-circuiting currents but which are not strong enough to safely interrupt them, such short-circuiting currents being interrupted by the main distributing circuit interrupter, thereby effecting a substantial saving in the initial cost of such systems.

The single figure of the accompanying drawing is a diagrammatic illustration of circuits and apparatus embodying my invention.

Referring to the drawings, a distributing circuit 1, which is connected to any suitable source of electric energy, is provided with a circuit interrupter 2 of any preferred type. The circuit interrupter 2 comprises a holding coil 3 that is adapted to be energized from a battery 7 in accordance with electrical conditions in the circuit 1, by means of an overload relay 4, a current transformer 5 and a releasing spring 6.

The circuit 1 supplies a plurality of feeder circuits 8 which are individually connected to any electrical translating device 9, such as a motor, through a second and smaller circuit interrupter 10. The circuit interrupters 10 are located in the feeder circuits 8 and will hereinafter be referred to as feeder circuit interrupters to distinguish them from the circuit interrupter 2, which is in the distributing circuit 1. The feeder circuit interrupters 10 are each supplied with a suitable closing coil 11 of any conventional type and with a low-voltage releasing mechanism which forms one of the important features of my invention.

The low-voltage releasing mechanism comprises an electromagnet 12 that is energized through a resistor 32 by a voltage transformer 13 in accordance with the condition in the circuit 8. An armature member 14 that is provided for the electromagnet 12 is of relatively large mass. A lever 15 extends from the circuit interrupter 10 to a point below the normal position of the armature member 14. The electromagnet 12 and armature member 14 correspond to the usual low-voltage release mechanism with which circuit interrupters are provided. Springs 16 normally bias the feeder circuit interrupters 10 to their open positions.

In the operation of a distributing system embodying my invention, upon the occurrence of a severe overload in any of the translating devices 9, or of a short circuit, the corresponding circuit interrupter 10 is placed under such electrical and mechanical stresses as it can safely withstand but which are too large to permit of the safe interruption thereof. Under such circumstances, the feeder circuit interrupters remain in closed position in the absence of an overload release mechanism. If the overload or short-circuit conditions in the circuit 8 reach a predetermined magnitude, the overload relay 4 opens its switch to de-energize the holding coil 3, thus permitting the spring 6 to trip the main circuit interrupter 2. The voltage transformer 13 is thereupon deenergized, which permits the armature 14 to move away from the electromagnet 12 under the influence of gravity or a stiff spring. The armature member 14, during its downward movement, strikes the lever 15 and permits the circuit interrupter 10 to open under the influence of the spring 16. When the circuit interrupter 2 is again closed, the circuit interrupter 10 may be manually or electrically closed, as desired.

For the purpose of preventing operation of the circuit interrupter 10 by reason of a sudden voltage collapse in the circuit 8, which condition may be very transitory, I also provide a current transformer 21 which energizes the electromagnet 12 in accordance with current transversing the circuit 8. Such a momentary voltage collapse would cause variation in the excitation of the electromagnet 12 by the transformer 13. However, so long as current traverses the circuit 8 the current transformer 21 energizes the electromagnet 12 sufficiently to prevent the armature 14 from moving away from the electromagnet. So soon as normal voltage is again established in the circuit 8, the electromagnet 12 is energized by both the transformers 13 and 21.

At times of momentary voltage collapse, it has been found that the transformer 13 acts as a secondary winding to the current transformer 21, the electromagnet 12 serving the purpose of a transformer core during this action. Under such circumstances, the current transformer 21 is ineffective in keeping the armature member 14 from leaving the electromagnet 12. It is for the purpose of reducing the induced current which traverses the voltage transformer 13 under such conditions that the resistor 22 is placed in circuit therewith.

It is to be observed that the circuit interrupter 2 is connected to the circuit interrupters 10 only indirectly by the feeder conductors and that no relays or mechanical interlocks are necessary, which feature permits the placing of the feeder circuit interrupters at a great distance from the main circuit interrupter. It is also to be observed that the feeder circuit interrupters 10 are never called upon to interrupt a short-circuit current and for this reason they may be of a comparatively small capacity. The circuit interrupter 2 must obviously be of large capacity but since the circuit interrupters which normally protect generating machinery from short-circuit conditions in the distributing system have a capacity sufficient for that purpose, my improved system entails no additional expense. At the same time, my system permits of the use of relatively small capacity circuit interrupters in the feeder circuits 8.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In combination, an electric circuit, a circuit interrupter therein, means for holding the circuit interrupter closed, and means for tripping the circuit interrupter comprising a magnet coil energized in accordance with the voltage of the electric circuit, a magnetizable core member for said magnet coil adapted to release the holding means when the voltage of the electric circuit decreases below a predetermined value, a second magnet coil associated with said magnetizable core member and arranged to prevent said core member from releasing the holding means as long as the electric circuit is traversed by current exceeding a predetermined value, and means included in the circuit of the first-mentioned magnet coil for limiting the current caused to traverse said circuit by the electromotive force induced in the first-mentioned magnet coil from the second-mentioned magnet coil.

2. In a distributing system, the combination with a supply circuit, a load circuit, a main circuit interrupter therebetween, a plurality of feeder circuits connected to the load circuit, and a circuit interrupter in each of the feeder circuits, of means for opening the main circuit interrupter when it is traversed by current exceeding a predetermined value, and means associated with each feeder circuit interrupter for maintaining the same closed until the main circuit interrupter has opened, said last-mentioned means comprising an electromagnet, an armature member therefor adapted to trip the associated feeder circuit interrupter when it is released by the electromagnet, an energizing coil for the electromagnet, a potential transformer having its primary winding connected across the associated feeder circuit, a current-limiting device connected in series with the secondary winding of said potential transformer and said electromagnet energizing coil, and a second energizing coil for the electromagnet energized in accordance with the current traversing said feeder circuit and co-operating with said first-mentioned energizing coil to prevent the release of the armature member as long as said current exceeds a predetermined value.

3. In a distributing system, the combination with a supply circuit, a load circuit, a main circuit interrupter therebetween, a plurality of feeder circuits connected to the load circuit, and a circuit interrupter in each of the feeder circuits, of means for opening the main circuit interrupter when it is traversed by current exceeding a predetermind value, and means associated with each feeder circuit interrupter for maintaining the same closed until the main circuit interrupter has opened, said last-mentioned means comprising an electromagnet, an armature member therefor adapted to trip the associated feeder circuit interrupter when it is released by the electromagnet, an energizing coil for the electromagnet, a potential transformer having its primary winding connected across the associated feeder circuit, a second energizing coil for the electromagnet energized in accordance with the current traversing said feeder circuit and co-operating with said first-mentioned energizing coil to prevent the release of the armature member, and a resistor connected in series with the secondary winding of said potential transformer and said first-mentioned electromagnet energizing coil to limit the current caused to traverse this circuit by the electromotive force induced in said first-mentioned energizing coil from said second energizing coil.

In testimony whereof, I have hereunto subscribed my name this 2nd day of October, 1923.

WILLIAM R. WICKERHAM.